United States Patent Office 3,248,355
Patented Apr. 26, 1966

3,248,355
SOLID POLYACROLEIN-BISULFITE ADDUCTS AND PROCESS FOR THE PRODUCTION THEREOF
Frank J. Welch, Charleston, and Thomas L. Dawson, South Charleston, W. Va., assignors to Union Carbide Corporation, a corporation of New York
No Drawing. Filed Feb. 26, 1962, Ser. No. 175,798
11 Claims. (Cl. 260—29.6)

The present invention is concerned with polyacrolein-bisulfite adducts, i.e., addition products, and with a process for their production. The invention is especially concerned with an improved process for the production of substantially water-soluble polyacrolein-bisulfite adducts whereby such products are conveniently obtained in a solid, ordinarily granular form. The invention is also concerned in particular with certain of the aforementioned polyacrolein-bisulfite adducts as novel compositions of matter having utility as thickening or gelling agents in aqueous environments at temperatures of up to about 30° C., or slightly higher, and which can be employed in conventional manner wherever such agents find common usage.

Readily water-soluble polyacrolein-bisulfite adducts are, in general, well known to the art, and find use, for instance, in the treatment of animal skins and leather, as additives which improve the wet- and dry-strength of paper, and in many other diverse applications. Such adducts have heretofore been prepared by the reaction of polyacrolein with an aqueous solution containing either sulfurous acid, or a metal bisulfite such as sodium bisulfite, etc. Typical reactions of this nature are described, by way of illustration, in U.S. Patent 2,657,192, British Patent 797,459 and in the article by R. C. Schulz in Kunstoffe, 47, 303 (1957). Via such reactions, it is to be noted, aqueous solutions of water-soluble polyacrolein-bisulfite adducts have heretofore been obtained.

However, the recovery of solid polyacrolein-bisulfite adducts from the aqueous solutions obtained by the prior art processes described above ordinarily involves inordinately inconvenient and uneconomical procedures, at best. For instance, the prior art, supra, describes the isolation of polyacrolein-bisulfite adducts from aqueous solutions by freeze-drying techniques. It is also known that the adducts can be recovered by precipitation upon the addition of the aqueous solution to a large volume of a non-solvent liquid, such as isopropanol, acetone or the like. Unfortunately, such recovery procedures are slow, and are not satisfactorily adaptable to a large-scale commercial operation due to the elaborate equipment which must be employed, particularly in connection with freeze-drying techniques, and/or the large volume of material which must be handled and which may not be amenable to recycling or reuse, especially in the case of recovery by precipitation. Thus, it can be seen that the preparation of polyacrolein-bisulfite adducts in solid form, rather than in aqueous solutions as obtained by the prior art, would be highly advantageous to commercial operations, and would, in addition, facilitate the transportation, or handling, and storage of the products. These advantages can now be realized conveniently through the practice of the present invention.

More particularly, this invention contemplates the preparation of a polyacrolein-bisulfite adduct by process steps which include bringing into reactive admixture a suspension of polyacrolein and a metal bisulfite of the formula $M(HSO_3)_m$, wherein M is a metal atom and $m$ is the valence or ionic charge of M, in a single-phase liquid diluent consisting essentially of a solution composed of water and a water-miscible inert organic liquid, in which diluent the resulting polyacrolein-bisulfite adduct is insoluble. In this reaction, the bisulfite is employed in an amount sufficient to convert at least 10 mole percent, and preferably from about 20 to about 80 mole percent, or more, of the polymerized acrolein units, on a theoretical monomer basis, to the corresponding bisulfite adduct units. The reaction can be illustrated by the equation:

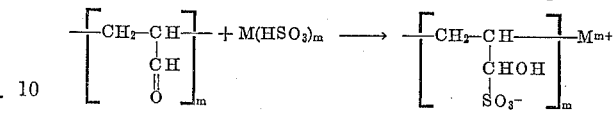

wherein M and $m$ are as defined above. It is to be noted that when M designates a divalent or polyvalent metal, the metal is connected to two or more polymerized acrolein units in the resulting product, depending upon its valence. It is also to be noted that polyacrolein, as is well known to the art, is a complex structure which, it is believed, contains polymerized acrolein units possessing free aldehyde groups, as indicated above, as well as units in which the aldehyde groups are masked in the form of aldehyde hydrate and acetal linkages. See, for instance, the article by Shulz or the British patent, supra. Under any circumstance, the polymer has been found to react with bisulfite as herein described to form the adducts contemplated by this invention.

When prepared in accordance with the process of this invention, the polyacrolein-bisulfite adduct is prepared in solid form. The solid product can thereafter be recovered by filtration or in any other convenient manner, and is preferably washed with an inert non-solvent organic liquid, such as methanol, etc., and dried.

It was indeed unexpected that a solid polyacrolein-bisulfite adduct could be prepared by the process of this invention in view of the fact that both of the reactants, as well as the product itself, are essentially insoluble in the liquid diluent employed. Such a process is thereby contrasted with prior art processes for the preparation of polyacrolein-bisulfite adducts which, as hereinabove indicated, depend upon the presence of the bisulfite in solution in order to obtain a product which is soluble in the diluent employed, and is itself therefore obtained in solution.

A difference also exists in the physical appearance of the solid polyacrolein-bisulfite adducts of this invention as compared with the solid products obtained by the prior art processes upon recovery by freeze-drying, solvent evaporation, precipitation, or the like, in that the adducts of this invention are, in general, obtained as spherical granules of high bulk density, and do not significantly differ in physical appearance from that of the unmodified polyacrolein precursor, while the prior art products are ordinarily glassy and are obtained upon comminution as irregularly shaped, sharp particles. Consequently, the adducts of this invention are more conveniently transported, or handled, and stored, and based upon the aforementioned physical characteristics, are frequently more readily employed in applications which depend upon the water solubility of the products.

It was also unexpected that certain of the polyacrolein-bisulfite adducts prepared by the process of this invention are useful as thickening or gelling agents for aqueous solutions or suspensions. Such adducts, more particularly, are those in which from about 20 to about 60 mole percent of the polymerized acrolein units of the polyacrolein precursor, on a theoretical monomer basis, have been converted to the corresponding bisulfite adduct units. These adducts, it has been found, form non-pourable gels upon stirring with water at room temperature in concentrations varying to as low as about 1 percent by weight of the adduct based upon the weight of water; and at somewhat lower concentartions in a similar environment are useful as thickening agents. Only upon heating or long standing are true solutions obtained therefrom. The latter-mentioned adducts of this invention are thereby further contrasted with polyacrolein-bisulfite adducts of similar chemical composition, i.e., polyacrolein to bisulfite mole ratio, prepared and recovered, however, by prior art processes as indicated above in that the products of the prior art are in all instances water soluble and have not been found to provide useful thickening or gelling agents.

Without wishing to be bound by theory, the fact that certain of the polyacrolein-bisulfite adducts of this invention as hereinabove described are useful as thickening or gelling agents is believed attributable to the possession by the adducts of a substantial number of unbroken acetal linkages, such number decreasing inversely with the amount of bisulfite in the adduct. These linkages, it is to be noted, are those which, as indicated in the prior art, supra, are believed possessed by the unmodified polyacrolein precursor, and which consequently remain after reaction thereof with a metal bisulfite in accordance with the process of this invention. Thus, the resulting products swell upon admixture with water at room temperature, and dissolve only upon heating or long standing, which, it is believed, causes the rupture of the remaining acetal linkages to an appreciable extent. On the other hand, neither the polyacrolein-bisulfite adducts in which substantially more than 60 mole percent of the polymerized acrolein units of the polyacrolein precursor, on a theoretical monomer basis, have been converted to the corresponding bisulfite adduct units, nor the polyacrolein-bisulfite adducts prepared and recovered by prior art processes as indicated above, notwithstanding their chemical composition, have been found to provide useful thickening or gelling agents in aqueous environments, particularly at low concentrations, and this is believed attributable to the rupture of a substantial number of the aforementioned acetal linkages during the production of the adducts.

The unmodified polyacrolein employed as a reactant in accordance with the process of this invention, i.e., the basic polymer or precursor from which the bisulfite adducts contemplated by this invention are obtained, is a high-molecular weight product having a reduced viscosity of at least about 0.2 up to about 15 or more, and preferably from about 0.5 to about 10, when measured at a temperature of 30° C. in an aqueous saturated sulfur dioxide solution in which 0.2 gram of polymer is dissolved. As previously indicated, the polymer is also generally insoluble in conventional solvents, such as water, alcohols, etc.

The basic polymer can be produced by a variety of methods. For instance, the polymer can be produced by the polymerization of acrolein, initiated thermally, or preferably, by contact with a free radical polymerization catalyst. Other conventional polymerization catalysts can also be employed. In addition, the polymerization can be carried out in bulk, in a solvent for the monomer, or in an aqueous emulsion or suspension system, and under atmospheric, subatmospheric or superatmospheric pressure. It is also highly desirable to conduct the polymerization in an inert atmosphere in order to prevent oxidation. Suitable gases which can be used to provide an inert atmosphere include nitrogen, argon, carbon dioxide, methane, ethane, and the like. Moreover, while the basic polymer is ordinarily produced by the homopolymerization of acrolein, polymers obtained by the homopolymerization of methacrolein or by copolymerization of acrolein or methacrolein with minor amounts of other alpha-beta ethylenically unsaturated compounds, especially aldehydes, can also be utilized in accordance with this invention.

A preferred method for producing the basic polymer comprises contacting acrolein with a free radical polymerization catalyst in an aqueous diluent at a temperature of from about 0° C. to about 100° C., and preferably from about 30° C. to about 60° C. The aqueous diluent can consist entirely of water, or can comprise a mixture of water and one or more conventional inert organic diluents. A conventional emulsifying or suspending agent is also preferably incorporated in the polymerization mixture.

The term "free radical polymerization catalyst," as employed herein, is intended to define compounds which contain —O—O— or —N=N— structural linkages, or are capable of forming such linkages by the action of dilute inorganic acids, or which otherwise produce free radicals in situ during the polymerization reaction. Typical free radical polymerization catalysts include, by way of illustration, hydrogen peroxide; organic peroxides, such as benzoyl hydroperoxide, acetyl hydroperoxide, lauroyl hydroperoxide, di-tertiarybutyl peroxide, tertiarybutyl hydroperoxide, cumene hydroperoxide, dibenzoyl peroxide, methyl benzoyl peroxide, acetyl benzoyl peroxide, peracetic acid, etc.; ammonium persulfate and alkali metal persulfates, such as sodium- and potassium persulfates, etc.; alkali metal- and ammonium percarbonates and perborates; alkyl percarbonates, such as isopropyl percarbonate and butyl percarbonate, etc.; azo compounds such as 2,2'-azobisisobutyronitrile, dimethyl 2,2'-azobisisobutyrate, 2,2'-azobis(2,4-dimethylvaleronitrile), 2,2'-azobisisobutyramide, etc.; trialkylborons, such as tributylboron and trioctylboron, etc., and the like. Also contemplated by the term "free radical polymerization catalyst" are the conventional water-soluble redox catalysts of the type commonly used in addition polymerization reactions. More particularly, the redox polymerization catalysts are those combinations of certain reducing agents with the free radical polymerization catalysts specifically described above, especially those containing an —O—O— structural linkage, which provide greatly accelerated rates of polymerization. The reducing agents, one or more of which can be employed, include, by way of illustration, sulfurous acid; alkyl-, alkali metal-, and ammonium sulfites, alkali metal- and ammonium bisulfites; sulfoxylates; alkyl-, alkali metal-, and ammonium nitrites; copper- and iron salts, as well as other lower valence salts of polyvalent metals, and the like. As typical of the reducing agents there can be mentioned, by way of illustration, sodium bisulfite, potassium bisulfite, ammonium bisulfite, sodium sulfite, dibutyl sulfite, sodium formaldehyde sulfoxylate, sodium nitrite, potassium nitrite, ammonium nitrite, amyl nitrite, cuprous sulfate, cupric sulfate, ferrous sulfate, ferric sulfate, ferrous nitrate, ferric nitrate, titanous sulfate, etc., and the like.

The concentration of catalyst can be varied over a broad range and can be selected, for example, on the basis of the rate of polymerization desired, in that an increase in catalyst concentration affects an increase in the rate of polymerization. On the other hand, the catalyst concentration also affects the molecular weight of the polymeric product in that the molecular weight of the product generally decreases as the catalyst concentration increases. The molecular weight of the product is, however, more sensitively controlled by the polymerization temperature, varying inversely therewith, and by the concentration of monomer in the aqueous diluent, varying directly therewith.

The concentration of the free radical polymerization catalyst can vary from about 0.01 percent by weight, or lower, to about 5 percent by weight, or higher, based upon the weight of the acrolein monomer, and preferably is in the range of from about 0.05 percent by weight to about 2 percent by weight based upon the weight of the acrolein monomer. Higher catalyst concentrations can also be employed, accompanied, however, by little additional advantage. The concentration of the reducing agent component of the free radical polymerization catalyst, when a redox-type is employed, generally constitutes from about 1 to about 50 percent by weight of the total catalyst concentration. The concentration of the reducing agent component can vary, for example, from about 0.005 percent by weight, or lower, to about 2 percent by weight, or higher, based upon the weight of the acrolein monomer, and preferably is in the range of from about 0.01 percent to about 1 percent by weight based upon the weight of the acrolein monomer.

The polymerization period can be varied broadly and need only be sufficient to produce a polymeric product. To this end, a polymerization period of from about 30 minutes or less up to about 100 hours or more can be employed, depending, for example, upon the temperature, catalyst, catalyst concentration, etc. The polymer is thereby formed as a high-molecular weight, water-insoluble, solid product, and can be recovered in any convenient manner, such as by filtration, centrifugation, or the like.

The polyacrolein-bisulfite adducts contemplated by this invention can subsequently be obtained via the process of this invention, as follows. In practice, unmodified polyacrolein, produced as described above, is suspended or slurried together with a metal bisulfite in a single-phase liquid diluent consisting essentially of a solution composed of water and at least one inert water-miscible organic liquid, in which diluent the resulting polyacrolein-bisulfite adduct is insoluble. The particular organic liquid employed in this regard is of salient importance to the invention in that, surprisingly, only certain of such liquids have been found operable, notwithstanding the insolubility of polyacrolein-bisulfite adducts in such liquids in general. Organic liquids found to be suitable include methanol, ethanol, N,N-dimethyl formamide, N,N-dimethyl acetamide, 2-methoxyethanol, diethylene glycol methyl ether [2-(2-methoxyethoxy)ethanol], and N-methyl-2-pyrrolidone. Of these, the use of methanol and/or ethanol is especially preferred based upon the availability and the ease with which they are subsequently recovered from the reaction system, by distillation for example, and recycled if desired.

Other inert water-miscible organic liquids, such as n-propanol, iso-propanol, tert-butanol, 1,4-dioxane, tetrahydrofuran, acetonitrile, butyrolactone, and 2-methoxyethyl acetate have also been evaluated in accordance with the process of the invention and have been found to be inoperable. In such instances, the diluent, viz., a single-phase solution composed of water and such organic liquid has been found to separate into two liquid phases in the presence of a metal bisulfite. The incorporation of polyacrolein in such a system resulted in the preparation of a polyacrolein-bisulfite adduct which subsequently swelled or dissolved in the aqueous phase and could not be conveniently recovered as a solid product. Other organic liquids which are not miscible with water, such as heptane, cyclohexane are inoperable for similar reasons. Still other water-miscible organic liquids, such as acetone, N-methyl formamide, ethylene glycol, and dimethylsulfoxide provide a single-phase diluent when admixed with water in the presence of a metal bisulfite, but which nevertheless has a swelling or solvent effect upon the resulting polyacrolein-bisulfite adduct, and therefore prevents the convenient recovery of a solid product as indicated above. In the absence of water, on the other hand, independently using, for example, heptane, cyclohexane, toluene and iso-propanol as the sole liquid diluent, only very low conversions to substantially water-insoluble polyacrolein-bisulfite adducts are obtained. Thus, the unexpected aspects of the present invention are further emphasized.

The proportion of organic liquid to water in the diluent employed in accordance with the process of this invention can vary from about 2 to about 10 parts by weight of the organic liquid per part of water, and, determined in part by the rate of reaction and convenience of operation, is preferably from about 2 to about 4 parts by weight of the organic liquid per part of water. The use of a lower proportion of organic liquid to water in the process of this invention is generally to be avoided since the resulting bisulfite-adduct is ordinarily produced as a sticky agglomerate, and is not readily recovered upon drying as a solid, granular product. A somewhat higher weight proportion of organic liquid to water, on the other hand, may also be used, although attended by a decreased rate of reaction between polyacrolein and metal bisulfite.

The proportion of water to polyacrolein employed in accordance with the process of this invention can vary from about 1 to about 10 parts by weight of water per part of polyacrolein, and is preferably from about 2 to about 5 parts by weight of water per part of polyacrolein. A somewhat lower weight proportion of water to polyacrolein may also be used, although here again, the presence of lesser amounts of water is often attended by a decreased rate of reaction between polyacrolein and metal bisulfite. Similarly, the presence of greater amounts of water, i.e., a higher weight proportion of water to polyacrolein, is generally to be avoided in the process of this invention for reasons such as those described above in connection with the use of a low organic liquid to water ratio.

As mentioned above, the metal bisulfite employed in accordance with the process of this invention can be represented by the generic formula $M(HSO_3)_m$, wherein M designates a metal atom and $m$ is the valence of M. Suitable metal bisulfites includes, for example, the bisulfites of metals of Groups IA, IIA, and IIIA of the Periodic Table as set forth in the Handbook of Chemistry and Physics, 38th ed., pp. 394–395, such as sodium bisulfide, potaasium bisulfite, calcium bisulfite, magnesium bisulfite, aluminum bisulfite, etc. Of these, the alkali metal (Group IA) bisulfites, and especially sodium bisulfite and potassium bisulfite, are preferred for use in the process of this invention. Similarly, ammonium bisulfite can also be employed. The suspension of the bisulfite can be effected by the incorporation in the diluent of the metal bisulfite as such, or as the corresponding pyrosulfite (meta-bisulfite) which, upon incorporation, forms the metal bisulfite.

The amount of metal bisulfite employed must be sufficient to render the polyacrolein polymer substantially water-soluble upon forming an adduct therewith. Thus, in carrying out the process of this invention, it has been found that a proportion of at least about $(0.1/m)$ mole, and preferably from about $(0.2/m)$ mole to about $(0.8/m)$ mole, or more, of the bisulfite per mole of polyacrolein on a theoretical monomer basis (i.e., per polymerized acrolein unit), wherein $m$ is as defined above, should be employed, such proportions producing essentially complete conversions to the corresponding bisulfite adduct. Moreover, to produce the polyacrolein-bisulfite adducts contemplated by this invention as thickening or gelling agents, a proportion of from about $(0.2/m)$ mole to about $(0.6/m)$ mole of bisulfite per mole of polyacrolein, on a theoretical monomer basis, is employed. As the ratio of bisulfite to polyacrolein decreases below about $(0.2/m)$ mole of bisulfite per mole of polyacrolein, on a theoretical monomer basis, a corresponding slight decrease in the water solubility of the resulting adduct has been noted, and when a proportion of less than about $(0.1/m)$ mole of bisulfite per mole of polyacrolein, on a theoretical monomer basis, is employed, a substantially water-soluble product is not obtained. On the other hand, a substantial excess of bisulfite of up to about $(2/m)$ moles, or more, thereof per mole of polyacrolein, on a theoretical monomer basis, can also be used, although little additional advantage may thereby be realized.

In the practice of the present invention, the unmodified polyacrolein and metal bisulfite, preferably in finely divided form, are suspended in the liquid diluent in any convenient manner. For example, the reactants can be simultaneously or consecutively slurried or admixed in the diluent, or a solution of the bisulfite in water can be added with stirring to a suspension of polyacrolein in the organic liquid contemplated as a component of the diluent, whereupon a single phase liquid diluent is formed and the bisulfite is precipitated out as a suspension in the diluent. Alternatively, the bisulfite can be suspended in the diluent subsequent to the suspension of polyacrolein. However, the unmodified polyacrolein and bisulfite reactants should not be brought into admixture in the sole presence of water, i.e., in the absence of, or before the introduction of the organic liquid component of the diluent, so as to avoid the swelling and/or agglomeration of the resulting polyacrolein-bisulfite adduct.

The suspension thus formed is thereafter maintained at a temperature of from about 0° C. to about 100° C., and preferably from about 20° C. to about 80° C., to sustain the desired reaction. In this connection, the reaction period can be varied broadly, and need only be sufficient to produce the desired product, as can readily be determined by one skilled in the art in the light of this disclosure. For instance, reaction periods of from about 5 minutes to about 10 hours, or more, and preferably from about 15 minutes to about 2 hours are best employed, although the process of the invention is in no way limited thereto.

The resulting polyacrolein-bisulfite adduct, like reactants from which it is obtained, being insoluble in the diluent, is formed as a solid and can be separated by filtration, decantation, or in any other convenient manner. The adduct is then preferably washed with an inert organic liquid such as that employed as a component of the diluent, and upon drying, generally at a temperature of up to about 100° C., is recovered as a solid, ordinarily granular product.

The invention can be illustrated further by the following specific examples of its practice. In the examples, and as employed elsewhere in this application, the term "reduced viscosity," which is well known in the art, defines the value obtained by dividing the specific viscosity of a polymer by the concentration of the polymer in solution, the concentration being measured in grams per 100 milliliters of solvent. The specific viscosity is obtained by dividing the difference between the viscosity of the polymer solution and the viscosity of the pure solvent by the viscosity of the solvent. In particular, the reduced viscosity values set forth in this application were measured at a temperature of 30° C. from a solution in which 0.2 gram of polymer was dissolved in 100 milliliters of a saturated solution of sulfur dioxide in water. The reduced viscosity of a polymer is regarded as a measure of the molecular weight of the polymer, i.e., the degree of polymerization, with higher values indicating higher molecular weights.

*Example I*

A solution containing 27 grams of sodium bisulfite dissolved in 60 grams of water was added dropwise over a five minute period to a stirred slurry of 7.27 grams of powdered polyacrolein (having a reduced viscosity of 4.1) in 300 milliliters of methanol. The suspension was stirred at a temperature of 50° C. for a period of 1 hour. The resulting suspension was then cooled, filtered, washed with methanol, and dried in a vacuum desiccator overnight. In this manner, a polyacrolein-sodium bisulfite adduct was obtained as a fine, white powder in a yield of 16.24 grams. A 2.32-gram sample of the product dissolved completely in 100 milliliters of water in one hour at room temperature. Two one-gram samples of the product were dissolved in water and titrated with 0.0998 N iodine solution to determine the amount of free bisulfite in the solution. It was found to contain less than 0.05 gram of uncombined bisulfite, showing that more than 90 percent of the sodium bisulfite in the product was chemically combined with polyacrolein.

*Example II*

A solution containing 20 grams of sodium bisulfite dissolved in 60 milliliters of water was added to a stirred slurry of 10 grams of powdered polyacrolein (having a reduced viscosity of 4.1) in 160 milliliters of methanol. The suspension was stirred at a temperature of 65° C. for a period of 1 hour. The resulting suspension was then cooled, filtered, washed three times with 150 milliliter portions of methanol, and dried. In this manner, a polyacrolein-sodium bisulfite adduct was obtained as a fine, white powder in a yield of 25.9 grams. A 2.59 gram sample of the product dissolved completely in 100 milliliters of water in 20 to 30 minutes at room temperature. In similar manner, the corresponding adduct of polyacrolein with potassium bisulte, calcium bisulfite, magnesium bisulfite, and aluminum bisulfite are obtained by the independent substitution of these bisulfites for sodium bisulfite in this example in the same mole ratio with regard to the amount of polyacrolein employed as a reactant.

*Example III*

A solution containing 30 grams of sodium bisulfite dissolved in 60 milliliters of water was added to a stirred slurry of 30 grams of powdered polyacrolein (having a reduced viscosity of 4.1) in 160 milliliters of methanol. The suspension was stirred at a temperature of from 65° C. to 70° C. for a period of 1 hour. The resulting suspension was then cooled, filtered, washed three times with 150 milliliter portions of methanol, and dried. In this manner, a polyacrolein-sodium bisulfite adduct was obtained as a white, granular solid in a yield of 63.6 grams. A 2.12-gram sample of the product dissolved in 100 milliliters of water in 50 minutes at a temperature of 75° C.

*Example IV*

A solution containing 20 grams of potassium metabisulfite dissolved in 60 milliliters of water was added to a stirred slurry of 10 grams of powdered polyacrolein (having a reduced viscosity of 2.2) in 160 milliliters of methanol. The mixture was stirred at a temperature of 65° C. for a period of 1 hour. The resulting suspension was then cooled, filtered, washed three times with 150 milliliter portions of methanol, and dried. In this manner, a polyacrolein-potassium bisulfite adduct was obtained as a fine white powder in a yield of 20.27 grams. A 2.02-gram sample of the product dissolved completely in 100 milliliters of water in 45 minutes at a temperature of 75° C.

*Example V*

A series of experiments was conducted to compare and differentiate the properties of the solid polyacrolein-metal bisulfite adducts obtained in accordance with the process of this invention with those of the solid adducts obtained by prior art processes as indicated above. In each instance, the unmodified polyacrolein precursor was the same, as was the proportion of metal bisulfite to polyacrolein employed in producing the adducts.

In Run No. 1, a solution containing 20 grams of sodium bisulfite dissolved in 60 milliliters of water was added to a stirred slurry of 20 grams of powdered polyacrolein in 160 milliliters of methanol. The suspension was stirred at a temperature of from 65° C. to 70° C. for a period of 2 hours. The resulting suspension was then cooled, filtered, washed with methanol, and dried overnight at 60° C. in a circulating air oven. In this manner, a solid polyacrolein-sodium bisulfite adduct was obtained as a white powder.

In Run No. 2, a portion of an aqueous solution of a polyacrolein-sodium bisulfite adduct formed by the reaction of equal amounts of polyacrolein and sodium bisulfite (10 percent by weight base upon the weight of the diluent) was introduced to a three-liter flask. A layer of the solution was frozen onto the walls of the flask by spinning the flask in a Dry-Ice-acetone bath. A vacuum was applied to the flask until all of the water had evaporated. The solution of the adduct remained frozen throughout the evaporation. The polyacrolein-sodium bisulfite adduct was then recovered from the flask in the form of a glassy solid.

In Run No. 3, a portion of the aqueous solution described in connection with Run No. 2 was introduced to a 500-milliliter flask. The flask was continuously rotated in a water bath at ambient temperature to avoid freezing and a vacuum was applied to the flask to accelerate the evaporation of the water present. The polyacrolein-sodium bisulfite adduct was then recovered from the flask in the form of a glassy solid.

In Run No. 4, a portion of the aqueous solution described in connection with Run No. 2 was diluted with an equal weight of water. The resulting solution was then added slowly to a baffled beaker containing 1200 milliliters of methanol which had been chilled to a temperature of 5° C. The methanol was stirred rapidly while the solution was being added. The polyacrolein-sodium bisulfite adduct thereby precipitated and upon filtration followed by drying overnight at a temperature of 60° C. in a circulating air oven, was recovered in the form of a glassy solid.

Photomicrographs of each of the adducts were taken to compare their shape and appearance, after which 3.5 grams of each of the adducts were added to 50 milliliters of water at room temperature to compare their solubility characteristics. However, in order to obtain photographs at high magnification to compare with unmodified polyacrolein (control) and the polyacrolein-bisulfite adduct produced by the process of this invention (Run No. 1), it was first necessary to break up the adducts recovered by freeze drying (Run No. 2), evaporation (Run No. 3), and precipitation (Run No. 4). The results obtained are tabulated below in Table A.

TABLE A

| | Particle Shape and Appearance | Solution Behavior |
|---|---|---|
| Control | Spherical | Insoluble. |
| Run No. 1 | do | Formed non-pourable gel.[1] |
| Run No. 2 | Irregular and sharp | Dissolved completely in 2 to 3 minutes. Never gelled. |
| Run No. 3 | do | Dissolved completely in 4 to 5 minutes. Never gelled. |
| Run No. 4 | do | Dissolved completely in 3 to 4 minutes. Never gelled. |

[1] Dissolves upon heating, and at substantially lower concentrations in water forms highly viscous dispersions rather than gels.

It can be seen from the above examples that the polyacrolein-bisulfite adduct produced by the process of this invention using a ratio of about 0.5 mole of sodium bisulfite per mole of polyacrolein, on a theoretical monomer basis, is useful as a thickening or gelling agent in an aqueous environment at room temperature, and dissolves upon heating. In similar manner, gel-forming polyacrolein-bisulfite adducts are prepared by the independent substitution of sodium bisulfite with potassium bisulfite, calcium bisulfite, magnesium bisulfite, and aluminum bisulfite in approximately the same ratio of $(0.5/m)$ mole thereof per mole of polyacrolein employed as a reactant, on a theoretical monomer basis, $m$ being as defined above. On the other hand, the adducts produced using a ratio substantially in excess of $(0.6/m)$ mole of the bisulfite per mole of polyacrolein, on a theoretical monomer basis, are in all instances readily water soluble.

*Example VI*

A series of experiments was conducted using various organic liquids in the process of this invention. In each instance, except where otherwise specifically indicated, a polyacrolein-sodium bisulfite adduct was prepared by the reaction of 2 grams of polyacrolein with 2 grams of sodium bisulfite in suspension in a single-phase diluent composed of a solution of 6 milliliters of water and 16 milliliters of organic liquid, at room temperature for a period of 1 to 2 hours. The resulting polyacrolein-bisulfite adducts were then recovered in each instance as a white powder by filtration, washing, and drying in a manner similar to that described above in Example I. Finally the time required for the dissolution of 1 gram of each of the adducts, on a polyacrolein basis, in 100 milliliters of water at a temperature of 75–80° C. was determined, and is indicated below in Table B.

TABLE B

| Organic liquid: | Dissolution time (minutes) |
|---|---|
| Ethanol | 15 |
| N,N-dimethyl formamide | 15 |
| 2-methoxyethanol | 15 |
| N-methyl-2-pyrrolidone [1] | 10 |
| N,N-dimethyl acetamide | 15 |
| Diethylene glycol methyl ether | 15–20 |

[1] In this instance, 20 grams of polyacrolein and 20 grams of sodium bisulfite were suspended in 60 milliliters of water and 160 milliliters of organic liquid at a temperature of 60° C. for a period of 1 hour.

Moreover, it is to be noted that the polyacrolein-sodium bisulfite adducts produced by the process of this invention in this series of experiments are also useful as thickening and gelling agents for aqueous solutions or suspensions at temperatures of up to about 30° C., or slightly higher.

What is claimed is:

1. A process for the production of a polyacrolein-metal bisulfite addition product in solid form, which process comprises suspending polyacrolein and a metal bisulfite of the formula $M(HSO_3)_m$, wherein M is selected from the group consisting of the Group IA, IIA and IIIA metals of the Periodic Table of the Handbook of Chemistry and Physics, 38*th* edition, at pages 394 to 395, and $m$ is the valence of M, in a single-phase liquid diluent of a solution consisting essentially of water and a water-miscible organic liquid selected from the group consisting of methanol, ethanol, N,N-dimethyl formamide, N,N-dimethyl acetamide, 2-methoxyethanol, diethylene glycol methyl ether, and N-methyl-2-pyrrolidone; there being present in the resulting suspension a proportion of from about 2 to about 10 parts by weight of organic liquid per part of water, from about 1 to about 10 parts by weight of water per part of polyacrolein, and at least about $0.1/m$ mole of metal bisulfite per mole of polyacrolein on a theoretical monomer basis, $m$ being as defined above; and maintaining the resulting suspension at a temperature of from about 0° C. to about 100° C. to produce said polyacrolein-metal bisulfite addition product.

2. An aqueous non-pourable gell comprising a polyacrolein-metal bisulfite addition product produced in accordance with the process of claim 1.

3. A process for the production of a polyacrolein-alkali metal bisulfite addition product in solid form, which process comprises suspending polyacrolein and an alkali metal bisulfite in a single-phase liquid diluent consisting essentially of a solution of water and methanol; there being present in the resulting suspension a proportion of from about 2 to about 4 parts by weight of methanol per part of water, from about 2 to about 5 parts by weight of water per part of polyacrolein, and from about 0.2 to about 2 moles of alkali metal bisulfite per mole of polyacrolein on a theoretical monomer basis; and maintaining the resulting suspension at a temperature of from about 20° C. to about 80° C. to produce said polyacrolein-alkali metal bisulfite addition product.

4. The process according to claim 3 wherein said alkali metal bisulfite is sodium bisulfite.

5. The process according to claim 3 wherein said alkali metal bisulfite is potassium bisulfite.

6. A process for the production of a polyacrolein-alkali metal bisulfite addition product in solid form, which process comprises suspending polyacrolein and an alkali metal bisulfite in a single-phase liquid diluent consisting essentially of a solution of water and ethanol; there being present in the resulting suspension a proportion of from about 2 to about 4 parts by weight of ethanol per part of water, from about 2 to about 5 parts by weight of water per part of polyacrolein, and from about 0.2 to about 2 moles of alkali metal bisulfite per mole of polyacrolein on a theoretical monomer basis; and maintaining the resulting suspension at a temperature of from about 20° C. to about 80° C. to produce said polyacrolein-alkali metal bisulfite addition product.

7. The solid polyacrolein-metal bisulfite addition product produced by the process which comprises suspending polyacrolein and a metal bisulfite of the formula $$M(HSO_3)_m$$

wherein M is selected from the group consisting of the Group IA, IIA, and IIIA metals of the Periodic Table of the Handbook of Chemistry and Physics, 38th edition, at pages 394 to 395, and $m$ is the valence of M, in a single-phase liquid diluent of a solution of water and a water-miscible organic liquid selected from the group consisting of methanol, ethanol, N,N-dimethyl formamide, N,N-dimethyl acetamide, 2-methoxyethanol, diethylene glycol methyl ether, and N-methyl-2-pyrrolidone; there being present in the resulting suspension a proportion of from about 2 to about 10 parts by weight of organic liquid per part of water, from about 1 to about 10 parts by weight of water per part of polyacrolein, and from about $0.2/m$ mole to about $0.6/m$ mole of metal bisulfite per mole of polyacrolein on a theoretical monomer basis, $m$ being as defined above; and maintaining the resulting suspension at a temperature of from about 0° C. to about 100° C. to produce said polyacrolein-metal bisulfite addition product.

8. The solid polyacrolein-alkali metal bisulfite addition product produced by the process which comprises suspending polyacrolein and an alkali metal bisulfite in a single-phase liquid diluent consisting essentially of a solution of water and methanol; there being present in the resulting suspension a proportion of from about 2 to about 4 parts by weight of methanol per part of water, from about 2 to about 5 parts by weight of water per part of polyacrolein, and from about 0.2 to about 0.6 mole of alkali metal bisulfite per mole of polyacrolein on a theoretical monomer basis; and maintaining the resulting suspension at a temperature of from about 20° C. to about 80° C. to produce said polyacrolein-alkali metal bisulfite addition product.

9. The product produced in accordance with claim 8, wherein said alkali metal bisulfite is sodium bisulfite.

10. The product produced in accordance with claim 8, wherein said alkali metal bisulfite is potassium bisulfite.

11. The solid polyacrolein-alkali metal bisulfite addition product produced by the process which comprises suspending polyacrolein and an alkali metal bisulfite in a single-phase liquid diluent consisting essentially of a solution of water and ethanol; there being present in the resulting suspension a proportion of from about 2 to about 4 parts by weight of ethanol per part of water, from about 2 to about 5 parts by weight of water per part of polyacrolein, and from about 0.2 to about 0.6 mole of alkali metal bisulfite per mole of polyacrolein on a theoretical monomer basis; and maintaining the resulting suspension at a temperature of from about 20° C. to about 80° C. to produce said polyacrolein-alkali metal bisulfite addition product.

References Cited by the Examiner

UNITED STATES PATENTS

| | | | |
|---|---|---|---|
| 2,993,878 | 7/1961 | Marks | 260—67 |
| 3,079,296 | 2/1963 | Houff et al. | 260—67 |
| 3,118,860 | 1/1964 | Eifert et al. | 260—67 |

WILLIAM H. SHORT, *Primary Examiner.*

JOSEPH R. LIBERMAN, JOSEPH L. SCHOFER,
*Examiners.*